(12) United States Patent
Hsi-Chang

(10) Patent No.: US 10,517,271 B2
(45) Date of Patent: *Dec. 31, 2019

(54) METHOD OF MANUFACTURING AN EQUINE PROTECTIVE COVERING

(71) Applicant: EASTWEST INTERNATIONAL (TAIWAN) ENTERPRISES, Taichung (TW)

(72) Inventor: Chang Hsi-Chang, Taichung (TW)

(73) Assignee: EASTWEST INTERNATIONAL (TAIWAN) ENTERPRISES, Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/235,803

(22) Filed: Dec. 28, 2018

(65) Prior Publication Data

US 2019/0141952 A1 May 16, 2019

Related U.S. Application Data

(63) Continuation-in-part of application No. 15/437,710, filed on Feb. 21, 2017, now Pat. No. 10,272,636.

(30) Foreign Application Priority Data

Feb. 9, 2017 (EP) ..................................... 17155407

(51) Int. Cl.
*A01K 13/00* (2006.01)
*B29C 65/56* (2006.01)
(Continued)

(52) U.S. Cl.
CPC ............ *A01K 13/007* (2013.01); *B29C 65/56* (2013.01); *B68C 1/12* (2013.01); *B29C 59/026* (2013.01); *B29L 2031/768* (2013.01); *B32B 3/266* (2013.01); *B32B 3/30* (2013.01); *B32B 5/245* (2013.01); *B32B 7/08* (2013.01); *B32B 25/10* (2013.01); *B32B 25/14* (2013.01);
(Continued)

(58) Field of Classification Search
CPC ...... A01K 13/007; B68C 1/12; B29C 59/026; B29C 65/56; B32B 2571/00; B32B 2266/0207; B32B 2037/0092; B29L 2031/768
USPC ............................................................ 54/82
See application file for complete search history.

(56) References Cited

U.S. PATENT DOCUMENTS 167,895 A * 9/1875 Hall ..................... A01K 13/007
168/2
231,594 A * 8/1880 Leighton ................... B68C 1/12
54/66
(Continued)

FOREIGN PATENT DOCUMENTS

WO 2015/089084 A1 6/2015

*Primary Examiner* — Claude J Brown
(74) *Attorney, Agent, or Firm* — Workman Nydegger

(57) ABSTRACT

A method of manufacturing an equine protective covering by applying a stamp comprises a profiled shape with a predetermined temperature and pressure to the interior side of the cushion assembly. The first synthetic fabric layer and the second neoprene layer are permanently bonded. The second neoprene layer is plastically deformed such that the profiled shape of the stamp is permanently transferred to the second neoprene layer. The plastic deformation of the second neoprene layer is such that the perforations remain open.

13 Claims, 13 Drawing Sheets

(51) Int. Cl.
*B68C 1/12* (2006.01)
*B29C 59/02* (2006.01)
*B32B 3/30* (2006.01)
*B32B 3/26* (2006.01)
*B32B 5/24* (2006.01)
*B32B 7/08* (2019.01)
*B32B 25/10* (2006.01)
*B32B 25/14* (2006.01)
*B32B 37/00* (2006.01)
*B29L 31/00* (2006.01)

(52) U.S. Cl.
CPC ............ *B32B 2037/0092* (2013.01); *B32B 2262/0276* (2013.01); *B32B 2266/0207* (2013.01); *B32B 2571/00* (2013.01)

(56) References Cited

U.S. PATENT DOCUMENTS

| | | | | |
|---|---|---|---|---|
| 810,332 A * | 1/1906 | Grean | A41D 27/26 | 2/268 |
| 2,621,138 A * | 12/1952 | Messing | B29C 59/026 | 156/209 |
| 2,752,279 A * | 6/1956 | Alderfer | B29C 44/569 | 428/133 |
| 3,012,926 A * | 12/1961 | Wintermute | B65B 9/02 | 156/199 |
| 3,819,033 A * | 6/1974 | Hueber | A45C 11/04 | 206/5 |
| 4,091,819 A * | 5/1978 | Huber | A41C 3/10 | 450/55 |
| 4,136,222 A * | 1/1979 | Jonnes | B29D 24/005 | 428/116 |
| 4,140,116 A * | 2/1979 | Hampicke | A61D 9/00 | 54/82 |
| 4,272,850 A * | 6/1981 | Rule | A41D 13/065 | 2/24 |
| 4,470,411 A * | 9/1984 | Hoyt, Jr. | A61D 9/00 | 54/82 |
| 4,516,572 A * | 5/1985 | Schlein | A61F 13/041 | 602/3 |
| 4,548,026 A * | 10/1985 | Shidner | A01K 13/007 | 168/2 |
| 4,561,124 A * | 12/1985 | Thompson | A41D 1/067 | 2/227 |
| 4,619,055 A * | 10/1986 | Davidson | A43B 7/146 | 36/28 |
| 4,622,908 A * | 11/1986 | Tranberg | A61D 9/00 | 112/418 |
| 4,671,049 A * | 6/1987 | Benckhuijsen | A01K 13/008 | 5/502 |
| 4,695,496 A * | 9/1987 | Lee | B32B 5/24 | 428/95 |
| 4,788,972 A * | 12/1988 | DeBusk | A61F 5/01 | 2/DIG. 1 |
| 4,832,010 A * | 5/1989 | Lerman | A61F 2/7812 | 602/63 |
| 4,961,418 A * | 10/1990 | McLaurin-Smith | A61F 13/06 | 602/21 |
| 5,115,627 A * | 5/1992 | Scott | A01K 13/007 | 128/882 |
| 5,178,163 A * | 1/1993 | Yewer, Jr. | A41F 9/002 | 128/876 |
| 5,334,135 A * | 8/1994 | Grim | A61F 5/0102 | 2/22 |
| 5,449,341 A * | 9/1995 | Harris | A61F 5/0109 | 2/16 |
| 5,656,352 A * | 8/1997 | Middleton | A41D 31/02 | 428/131 |
| 5,695,452 A * | 12/1997 | Grim | A61F 5/0102 | 602/19 |
| 5,896,580 A * | 4/1999 | Aldrich | A41D 13/065 | 2/22 |
| 5,910,126 A * | 6/1999 | Wilson | A01K 13/007 | 119/850 |
| 5,924,134 A * | 7/1999 | Taylor | A41D 31/085 | 2/81 |
| 5,925,010 A * | 7/1999 | Caprio, Jr. | A61F 5/0109 | 602/62 |
| 6,080,121 A * | 6/2000 | Madow | A61F 5/0109 | 128/876 |
| 6,093,468 A * | 7/2000 | Toms | A41D 13/0158 | 428/67 |
| 6,306,006 B1 * | 10/2001 | Cheng | A41C 3/10 | 2/267 |
| 6,425,135 B1 * | 7/2002 | Aldrich | A41D 13/0593 | 2/22 |
| 6,508,776 B2 * | 1/2003 | Chiang | A61F 5/0104 | 602/5 |
| 6,654,960 B2 * | 12/2003 | Cho | A63B 71/1225 | 2/22 |
| 7,219,486 B1 * | 5/2007 | Conforth | B68C 1/12 | 54/66 |
| 2002/0094430 A1 * | 7/2002 | Baruch | A01K 13/006 | 428/316.6 |
| 2002/0146536 A1 * | 10/2002 | Bard | A61F 5/01 | 428/138 |
| 2003/0062635 A1 * | 4/2003 | Stutzmann | B29C 59/022 | 264/1.7 |
| 2004/0031246 A1 * | 2/2004 | Springs | A01K 13/007 | 54/82 |
| 2004/0146691 A1 * | 7/2004 | Laaksonen | A41D 31/02 | 428/136 |
| 2005/0255789 A1 * | 11/2005 | Gaudet | A41C 3/0057 | 450/41 |
| 2006/0029772 A1 * | 2/2006 | Huang | B32B 3/26 | 428/138 |
| 2006/0198993 A1 * | 9/2006 | Goyarts | A61F 5/485 | 428/196 |
| 2006/0201612 A1 * | 9/2006 | Lin | B32B 38/04 | 156/229 |
| 2006/0211317 A1 * | 9/2006 | Rossi | A41D 31/02 | 442/149 |
| 2006/0231045 A1 * | 10/2006 | Lindley | A01K 13/007 | 119/856 |
| 2007/0044195 A1 * | 3/2007 | Atkinson | A41B 13/00 | 2/24 |
| 2007/0077393 A1 * | 4/2007 | Chiang | A61F 5/01 | 428/131 |
| 2008/0184678 A1 * | 8/2008 | Chang | A01K 13/006 | 54/65 |
| 2009/0117824 A1 * | 5/2009 | Jian | A41C 3/10 | 450/38 |
| 2009/0181206 A1 * | 7/2009 | Chang | A01K 13/007 | 428/71 |
| 2009/0288377 A1 * | 11/2009 | Heid | A01K 13/007 | 54/82 |
| 2009/0293167 A1 * | 12/2009 | Kottler | A41D 1/08 | 2/23 |
| 2010/0129573 A1 * | 5/2010 | Kim | B32B 3/10 | 428/34.1 |
| 2011/0035864 A1 * | 2/2011 | Gordon | A41D 13/05 | 2/455 |
| 2011/0209275 A1 * | 9/2011 | Berns | A41D 13/0506 | 2/455 |
| 2012/0225257 A1 * | 9/2012 | Noda | B32B 5/18 | 428/174 |
| 2013/0014477 A1 * | 1/2013 | Wollowick | B68C 1/08 | 54/66 |
| 2013/0025035 A1 * | 1/2013 | Turner | A41D 13/05 | 2/455 |
| 2013/0025036 A1 * | 1/2013 | Turner | A42B 3/125 | 2/455 |
| 2013/0025037 A1 * | 1/2013 | Turner | A41D 13/0593 | 2/455 |
| 2013/0216774 A1 * | 8/2013 | Conolly | B32B 15/046 | 428/135 |
| 2013/0303041 A1 * | 11/2013 | Kim | A43B 1/0009 | 442/1 |

(56) References Cited

U.S. PATENT DOCUMENTS

| | | | |
|---|---|---|---|
| 2014/0130240 A1* | 5/2014 | Olivares Velasco | A42B 3/125 2/414 |
| 2014/0290588 A1* | 10/2014 | Click | A01K 13/007 119/850 |
| 2014/0305085 A1* | 10/2014 | Munoz | B68C 5/00 54/82 |
| 2014/0327957 A1* | 11/2014 | Conolly | G02B 5/26 359/360 |
| 2015/0040524 A1* | 2/2015 | Benetti | B68C 1/126 54/66 |
| 2015/0239729 A1* | 8/2015 | Gehring | B68C 1/02 54/44.5 |
| 2015/0306839 A1* | 10/2015 | Beliveau | A41D 31/065 428/195.1 |
| 2017/0172220 A1* | 6/2017 | Sung | A41C 3/0085 |
| 2017/0340039 A1* | 11/2017 | Jur | A41D 13/0512 |

* cited by examiner

METHOD OF MANUFACTURING AN EQUINE PROTECTIVE COVERING

TECHNICAL FIELD

The invention is related to the technical field of an equine protective covering and a method of manufacturing such an equine protective covering. It concerns specifically equine protective coverings for the lower limbs of a horse, also known as for example an equine support boot, equine leg protection, a girth, etc. and their method of manufacturing.

BACKGROUND

Such an equine protective covering is for example known from US2009/0181206. The known equine protective covering comprises a cushion assembly with a plastic foam body that is used as a base material which is bonded with a cloth. In order to improve air and moisture circulation the foam body and cloth combination comprise through holes which pierce through both the cloth and the foam body. In this way multiple small holes are visible at the cloth surface of the material which contacts the equine body when mounted to improve ventilation and moisture circulation. The foam body is for example a natural or synthetic rubber type foam body. The foam body is bonded with the cloth by means of a bonding material, such as a glue, binder, etc. Although the perforations provide for an improved ventilation and moisture circulation, dirt or other undesired substances can accumulate unhindered in these perforations as they extend through both the base material and the cloth, thereby reducing the efficiency of the ventilation and moisture circulation. Further as the cloth must be bonded to the base layer by means of a glue or binder, before the perforations are created, this leads to undesired delays in the manufacturing of such an equine protective covering. After application of the glue or the binder, a sufficient time period must elapse in order to ensure a sufficient setting of the glue or binder, before the cloth and base material combination can be perforated without a risk for delamination of the cloth and base material.

A further equine protective covering is for example known from WO2015/089084. This known equine protective covering comprises an inner neoprene layer which can be provided with perforations, similar as described above. To the interior side of the neoprene layer there can be secured a thin knit fabric for shielding the perforations of the neoprene layer from dirt and other undesired substances. This knit fabric is secured to the perforated neoprene layer by means of stitching around the edges and shields. As the knit fabric is only secured to the perforated neoprene around the edges, it is can freely detach from to the neoprene layer at other locations, such as for example in the center area. In this way the detached areas of the knit fabric are more prone to damage and wear. This is especially the case when mounting or dismounting the equine protective covering, as then detached part of the knit fabric could be subjected to unallowable localized stresses and/or leads to the risk of ending rippled or folded in between the neoprene layer and the limb of the horse, thereby leading to a reduced level of comfort for the horse. Application of glue or a binder to solve this issue is not possible for this embodiment, as the glue or binder in this case should be applied to the already perforated neoprene layer, which could lead to the risk of closing of the perforations by means of this glue or binder, thereby reducing the efficiency with respect to ventilation and moisture circulation.

Therefor there still exists a need for an improved equine protective covering which solves the above mentioned problems, and provides for an improved ventilation and moisture circulation, a more qualitative, durable and comfortable equine protective covering and a more efficient manufacturing method for such an improved equine protective covering.

SUMMARY

According to a first aspect of the invention there is provided a method of manufacturing an equine protective covering comprising a cushion assembly extending from a cushion interior side which contacts the equine body when mounted to a cushion exterior side facing away from the equine body when mounted, wherein the cushion assembly comprises:
  a first synthetic fabric layer at the cushion interior side;
  a second neoprene layer extending from the first synthetic fabric layer towards the exterior side,
wherein the method comprises the steps of:
  providing the second neoprene layer;
  perforating the second neoprene layer such that a plurality of perforations extend completely through the neoprene layer in a direction from the interior side to the exterior side;
  providing the first synthetic fabric layer at the interior side of the cushion assembly to the neoprene layer;
  applying a stamp comprising a profiled shape with a predetermined temperature and pressure to the interior side of the cushion assembly such that concurrently:
  the first synthetic fabric layer and the second neoprene layer are permanently bonded;
  the second neoprene layer is plastically deformed such that the profiled shape of the stamp is permanently transferred to the second neoprene layer; and
  the plastic deformation of the second neoprene layer is such that the perforations remain open.

In this way, there is provided for an improved ventilation and moisture circulation by means of the perforations and the profiled shape, a more qualitative, durable and comfortable equine protective covering by means of the thermal bonding provided by the heated stamp and a more efficient manufacturing method as the neoprene layer can be perforated before it is bonded to the other layers of the cushion assembly and the only tool that is required to perform the operations of bonding and providing the profiled shape is a heated stamp. Further as the perforations are shielded by an unperforated first synthetic fabric layer, the risk of dirt accumulation is reduced.

According to a preferred embodiment there is provided a method of manufacturing, wherein the second neoprene layer comprises perforations which cover a percentage of 20% to 80% of the surface of the second neoprene layer.

According to a preferred embodiment there is provided a method of manufacturing, wherein the second neoprene layer comprises perforations which cover a percentage of 40% to 70% of the surface of the second neoprene layer.

In this way a light weight equine protective covering is obtained in which moisture circulation and ventilation are optimized.

According to a preferred embodiment there is provided a method of manufacturing, wherein the volumetric weight of the cushion assembly is 0.20 g/cm$^3$ or lower.

According to a preferred embodiment there is provided a method of manufacturing, wherein the volumetric weight of the cushion assembly is 0.16 g/cm$^3$ or lower.

In this way a light weight cushion assembly is provided for, which comprises a reduced weight when compared with prior art embodiments which do not comprise perforations.

According to a preferred embodiment there is provided a method of manufacturing, wherein the first synthetic fabric layer comprises one or more of the following:
 a knit fabric comprising synthetic fibres;
 a stretch fabric.

In this way the first synthetic fabric layer comprises a sufficient level of stretchablility in order to allow for easy bonding with the plastically deformed parts of the neoprene layer.

According to a further embodiment there is provided a method of manufacturing, wherein in that the second neoprene layer comprises one or more of the following:
 a solid neoprene layer;
 a foamed neoprene layer.

In this way the cushion assembly comprises sufficient elasticity to provide for good cushioning properties, while also providing for a good match with the synthetic fabric layer to allow for secure thermal bonding.

According to a further embodiment there is provided a method of manufacturing, wherein:
 the first synthetic fabric layer comprises a thickness in the range of 0.2 mm to 5 mm, preferably in the range of 0.5 mm to 2 mm; and
 the second neoprene layer comprises a thickness in the range of 2 mm to 20 mm, preferably in the range of 5 mm to 15 mm.

According to a further embodiment there is provided a method of manufacturing, wherein:
 the temperature and pressure is sufficiently high to bond the first synthetic fabric layer and the second neoprene layer permanently and to deform the second neoprene layer plastically such that the profiled shape of the stamp is permanently transferred to the second neoprene layer; and
 the temperature and pressure is sufficiently low such that the plastic deformation of the second neoprene layer is such that the perforations remain open.

In this way optimal bonding and plastic deformation is achieved while not closing of the perforations thereby retaining optimal moisture and air circulation.

According to a further embodiment there is provided a method of manufacturing, wherein:
 the first synthetic fabric layer and the second neoprene layer are permanently bonded; and
 the second neoprene layer is plastically deformed such that the profiled shape of the stamp is permanently transferred to the second neoprene layer,
 by means of the stamp in a single step.

According to a further embodiment there is provided a method of manufacturing, wherein the method comprises the further step of:
 providing a third synthetic fabric layer at the exterior side of the neoprene layer of the cushion assembly, after the second neoprene layer was perforated and before the stamp is applied.

In this way the perforations are even better shielded against dirt accumulation by this unperforated third synthetic fabric layer.

According to a further embodiment there is provided a method of manufacturing, wherein the profiled shape comprises:
 a diamond pattern;
 a circular pattern;
 a pattern comprising one or more straight or curved sections.

According to a second aspect of the invention, there is provided an equine protective covering manufactured according to the method according to the first aspect of the invention, wherein the cushion assembly comprises:
 the first synthetic fabric layer and the second neoprene layer that are permanently bonded;
 the second neoprene layer that is plastically deformed such that the profiled shape of the stamp is permanently transferred to the second neoprene layer; and
 wherein the plastic deformation of the second neoprene layer is such that the perforations remain open.

According to a further embodiment there is provided an assembly comprising an equine protective covering, wherein the assembly comprises one or more of the following:
 an equine saddle blanket;
 an equine girth protector;
 an equine tendon boot;
 an equine fetlock boot;
 an equine knee boot.

BRIEF DESCRIPTION OF THE DRAWINGS

Some exemplary embodiments will now be described with reference to the drawings in which.

DETAILED DESCRIPTION OF EMBODIMENT(S)

Figure 1:
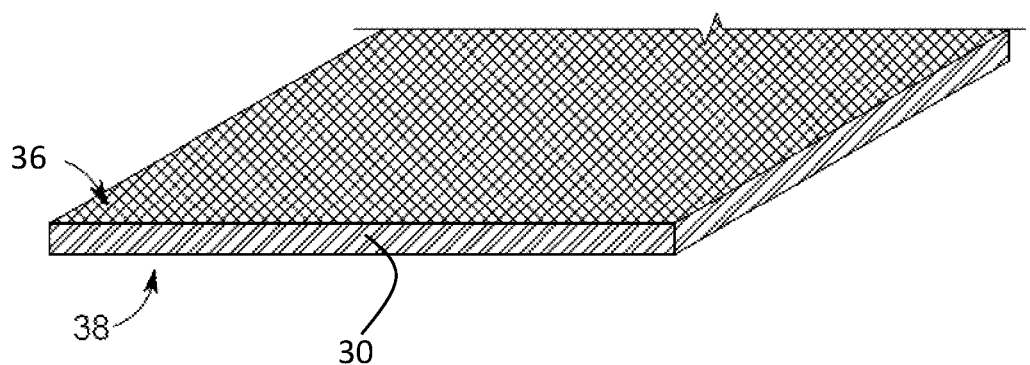
FIG. 1 shows an embodiment of a first synthetic fabric layer.

According to the embodiment shown in FIG. 1, there is provided a first synthetic fabric layer 30. This first synthetic fabric layer 30 could for example comprise a knit fabric with a suitable level of elasticity to allow local elongation of the fabric up to for example an elongation of 5 mm per 10 mm of fabric. Although a knit fabric, for example a knit fabric comprising synthetic fibers, such as for example polyester fibers or other fibers comprising a suitable resistance to wear and cleanability, is preferred, it is clear that alternative embodiments are possible such as a woven fabric comprising synthetic fibers with a suitable level of elasticity, a non-woven layer, etc. In general it is preferred that this first synthetic fabric layer, as shown does not comprise any perforations, which extend completely through this first synthetic fabric layer. It is clear that, although a desired level of permeability for air and moisture is desired for the first synthetic fabric, which is linked to the knitted, woven or non-woven structure of the first synthetic fabric 30, which inherently comprises passages in between the fibers for air and/or moisture. However, when referring to the lack of perforations extending through this first synthetic fabric 30 in the context of this description, this means that no additional perforations, holes, cutouts, etc. were established in the first synthetic fabric layer during or after manufacturing of this first synthetic fabric 30 for example by means of a suitable knitting manufacturing process, weaving manufacturing process, non-woven manufacturing process, etc. According to an exemplary embodiment the first synthetic fabric layer 30 could for example comprise a stretch fabric. Such a stretch fabric comprises a suitable knitted or woven synthetic fabric which can be stretched. Preferably such a stretch fabric for example makes use of fibers comprising neoprene, such as spandex or elastane, also known under the brand name Lycra for example, which preferably allow for a 4-way stretch fabric, which allows for stretching in both directions, this means stretching along both the crosswise and lengthwise direction of the fabric. The thickness of the first synthetic fabric 30 is in the range of 0.2 mm to 5 mm, preferably in the range of 0.5 mm to 2 mm.

Figure 2:
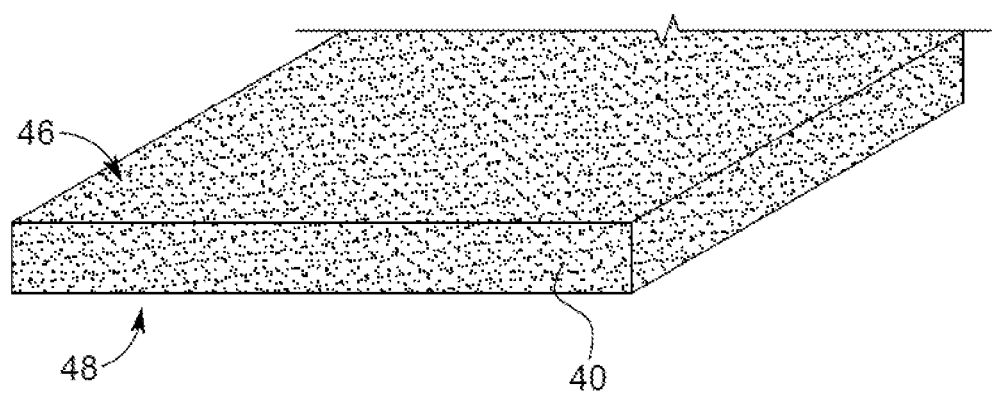
FIG. 2 shows an embodiment of a second neoprene layer.

According to the embodiment of FIG. 2 there is provided a second neoprene layer 40 as a step of the manufacturing method of an embodiment of an equine protective covering. It is clear that such a neoprene layer 40 consists of a synthetic rubber layer comprising a compound known as neoprene, or Neoprene or polychloroprene, which is a family of synthetic rubbers that are produced by polymerization of chloroprene. According to the embodiments shown, the neoprene layer 40 is for example formed as a solid neoprene layer, however, it is clear that according to alternative embodiments the neoprene layer could be formed as a neoprene layer comprising numerous small gas bubbles, also known as a foamed neoprene layer. It is clear that still further alternative embodiments are possible as long as the second neoprene layer 40 is a layer formed from one or more compounds among which there is at least one compound comprising neoprene.

Figure 3:
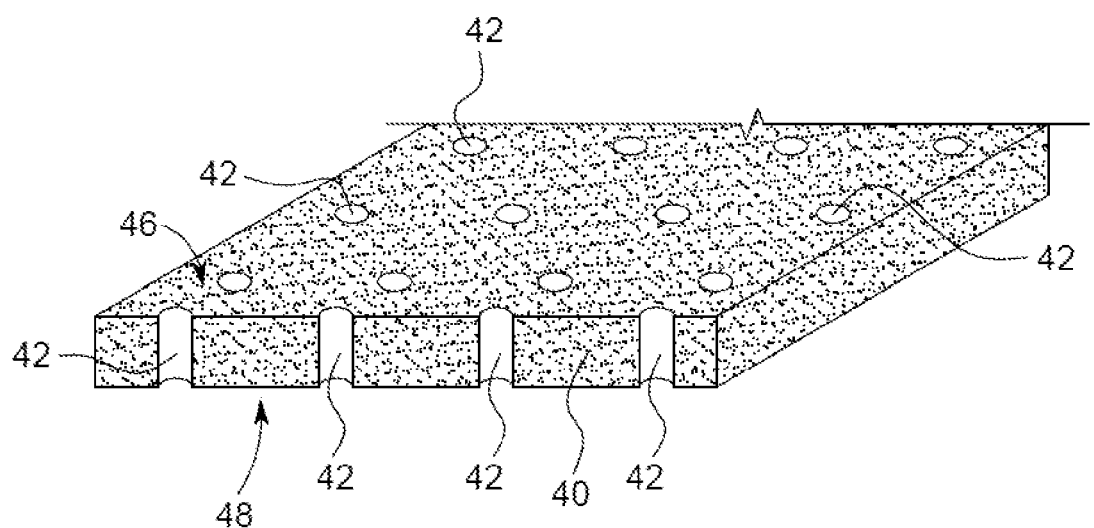
FIG. 3 shows the second neoprene layer of FIG. 2 after the perforation step.

As shown in FIG. 3 the second neoprene layer 40 during a next step of the method of manufacturing is perforated such that a plurality of perforations 42 extend completely through the neoprene layer 40. This means that, as shown these perforations 42 extend from one side 46 of the neoprene layer 40, through the thickness of this neoprene layer 40, to the other side 48 of this neoprene layer 40. The thickness of the neoprene layer is for example in the range of 2 mm to 20 mm, preferably in the range of 5 mm to 15 mm. According to the embodiment shown, the perforations comprise a circular or oval contour with a diameter in the range of 1 mm to 5 mm, preferably in the range of 2 mm to 3 mm. However it is clear that alternative shapes of the contour are possible such as triangular, square, rectangular, pentagonal, hexagonal, any other suitable polygonal or any other suitable contour comprising one or more straight and/or curved sections, as long as in general the contour of the perforation 42 circumscribes an area similar as mentioned above for the embodiment of the circular contour of the perforations 42 of the embodiment of FIG. 3. The step of providing the perforations 42 in the second neoprene layer 40 could be performed in a number of suitable ways, for example by applying a punching or perforating stamp to the neoprene layer 40 in the unperforated state as shown in FIG. 3. However, alternatives, such as for example manufacturing the neoprene layer 40 in a suitable mold, such that, when solidified and/or cured the neoprene layer 40 comprises these perforations, etc. are also possible. It is however clear the perforation step is executed in such a way that the perforations 42 extend entirely through the neoprene layer 40. As further shown in FIG. 3, the neoprene layer 40 comprises a plurality of such perforations 42. According to the embodiment shown the plurality of perforations 42 are arranged in an orderly pattern, whereby these perforations 42 are distributed in a uniform way along the neoprene layer 40. It is clear that alternative embodiments are possible, in which an alternative pattern, a non-uniform distribution, etc. is used for distribution of the plurality of perforations 42 across the neoprene layer 40. Preferably the number of perforations 42 is large enough to establish a sufficient level of air and moisture circulation, when the neoprene layer 40 is comprised in the equine protective covering 10 as will be described in further detail below. For example for 1 $cm^2$ of the surface of the neoprene layer 40 the perforations 42 cover a surface in the range of 0.2 $cm^2$ to 0.8 $cm^2$, preferably in the range of 0.4 $cm^2$ to 0.7 $cm^2$, or in other words the perforations 42 cover for example a percentage of 20% to 80% of the surface of the neoprene layer 40, preferably 40% to 70%. According to still further embodiments the perforations could for example comprise a circular contour with a hole diameter of 1.5 mm and be spaced 8 mm apart, or a hole diameter of 2 mm and be spaced 5 mm or 8 mm apart, or a diameter of 3 mm and be spaced 5 mm or 8 mm or 16 mm apart, etc.

Figure 4:
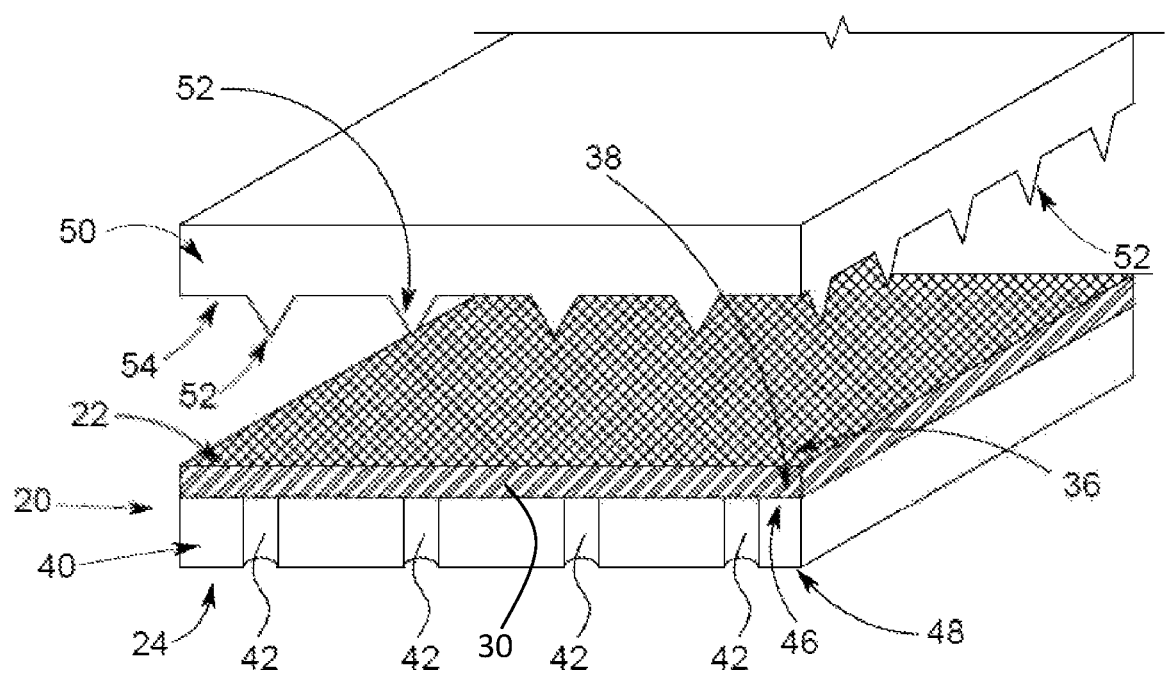
FIG. 4 shows the second neoprene layer of FIG. 2 bonded with the first synthetic fabric layer of FIG. 1 during application of the stamp.

As shown in FIG. 4, after the perforation step, according to the embodiment of the method of manufacturing of the embodiment of an equine protective covering 10 according to FIGS. 1 to 3, the first synthetic fabric layer 30 is provided at a first side 46 of the neoprene layer 40. As will be described in further detail below, this first side 46 of the neoprene layer is faced to the cushion interior side 22 of an equine protective covering 10. This cushion interior side 22 is the side of the equine cushion assembly 20 which contacts the equine body when mounted. As further shown the second neoprene layer 40 comprises an opposing second side 48. As will described in further detail below this second side 48 of the neoprene layer 40 is faced to the cushion exterior side 24 of the cushion assembly 20. This cushion exterior side 24 being the side of the cushion assembly 20 facing away from the equine body when mounted. As shown in FIG. 4, this thus means that the first synthetic fabric layer 30 is pressed against the first side 46 of the second neoprene layer 40, such that it at least partially covers this first side 46 of the second neoprene layer 40. As further shown in FIG. 4, it is clear that the first synthetic fabric layer 30, similar as the second neoprene layer 40 also, comprises an opposing first side 36 and second side 38, which similarly, when comprised in the cushion assembly 20 of an equine protective covering 10 will respectively face the cushion interior side 22 and the cushion exterior side 24 when mounted. As will be explained in further detail below, in this way the first synthetic fabric layer 30 is provided at the interior side 22 of the cushion assembly 20 to the neoprene layer 40.

As further shown in FIG. 4 a stamp 50 is applied to the interior side of the cushion assembly 20, this means, as shown, that the stamp is applied in such a way that it will press the first synthetic fabric layer 30 against the first side 46 of the perforated second neoprene layer 40. As shown, this thus means that the second side 38 of the first synthetic fabric layer 30 is pressed against the first side 46 of the second neoprene layer 40. As further shown, the stamp comprises a profiled shape 52. According to the embodiment shown, the profiled shape 52 comprises a diamond pattern, however as will be described in more detail below with reference to FIGS. 7 to 10, alternative patterns for the profiled shape 52 are possible. The stamp will be pressed against the interior side 22 of the cushion assembly with a suitable predetermined temperature and pressure. The most suitable pressure and temperature will vary in accordance with the particular embodiments of the first synthetic fabric layer 30, the second neoprene layer 40 and the stamp 50. Parameters which will influence the most suitable temperature and pressure for application of the stamp 50 to the cushion assembly are for example the specific material of the first synthetic fabric layer 30, the specific material of the second neoprene layer 40, the thickness of respectively the first synthetic fabric layer 30 and/or the second neoprene layer 40, the size and distribution of the perforations 42 in the second neoprene layer 40, the specific pattern of the profiled shape 52 of the stamp 50, the height of the profiled shape 52 of the stamp 50 and the corresponding depth of the indentations that are desired in the cushion assembly 20, etc. It is clear that a skilled person will be able to determine the most suitable temperature and pressure by means of experimentation in which the suitable temperatures and pressures for application of the stamp 50 in general need to guarantee, when the stamp 50 comprising the profiled shape 52 is applied to the interior side 22 of the cushion assembly 20, that concurrently:

the first synthetic fabric layer 30 and the second neoprene layer 40 are permanently bonded;

the second neoprene layer 40 is plastically deformed such that the profiled shape 52 of the stamp 50 is permanently transferred to the second neoprene layer 40; and the plastic deformation of the second neoprene layer 40 is such that the perforations 42 remain open.

It is further clear as shown that the profiled shape 52 extends from a first side 54 of the stamp 50 which faces towards the cushion assembly 20, and more particularly the cushion interior side 22 of the cushion assembly 20, during the step of the manufacturing method as for example shown in FIG. 4. It is clear that the temperature and pressure are chosen in a preferred range by means of the following considerations. Firstly the temperature and pressure should be sufficiently high to bond the first synthetic fabric layer 30 and the second neoprene layer 40 permanently. Secondly the temperature and pressure should also be sufficiently high to deform the second neoprene layer 40 plastically such that the profiled shape 52 of the stamp 50 is permanently transferred to the second neoprene layer 40. Thirdly the temperature and pressure should be sufficiently low in order to limit the plastic deformation of the second neoprene layer 40 to a level which ensures that the perforations 42 remain open. It is further also clear that, although alternative embodiments are possible in which for example first the first synthetic fabric layer 30 is bonded to the second neoprene layer 40 by a first stamp and subsequently a second stamp is applied to provide for the profiled shape, preferably the stamp 50, by means of a single step bonds the first synthetic fabric layer 30 and the second neoprene layer 40 permanently; and plastically deforms the second neoprene layer 40 such that the profiled shape 52 of the stamp 50 is permanently transferred to the second neoprene layer 40. It is clear that, as known to a man skilled in the art plastic deformation comprises a type of deformation which is irreversible, after the material has been loaded in such a way that it reaches the plastic range of its stress-strain curve. It is however also clear to a man skilled in the art that typically, for the material to reach the plastic deformation range, the material will first have to undergone elastic deformation, which is reversible, so the material will return partly to its original shape. It is thus clear to a man skilled in the art that the depth of the profiled shape 52 as remaining in the cushion assembly 20 after application of the stamp 50, will be somewhat reduced with respect to the depth of the profiled shape 52 as present on the stamp 50 itself.

Figure 5:
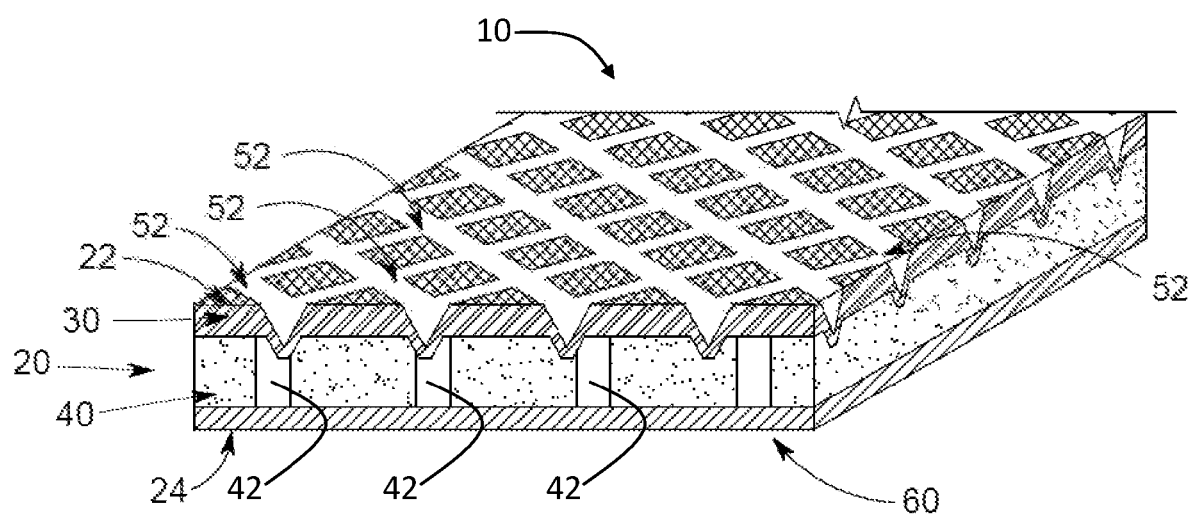
FIG. 5 shows the second neoprene layer of FIG. 2 bonded with the first synthetic fabric layer of FIG. 1 after application of the stamp.

As further shown in FIG. 5, according to an alternative embodiment, there is provided a cushion assembly 20 comprising a third synthetic fabric layer 60. This synthetic fabric layer 60 could comprise a similar synthetic fabric as described above with reference to the first synthetic fabric layer 30. This is realized by means of a method of manufacturing similar as described above, in which additionally the third synthetic fabric layer 60 is provided at the exterior side 24 of the neoprene layer 40 of the cushion assembly 20, after the second neoprene layer 40 was perforated and before the stamp 50 is applied. It is clear that the cushion assembly 20 is also light weight. For example according to a particular embodiment a cushion assembly comprising an area of for example 25 $cm^2$, and a thickness of 0.278 cm, comprises a weight 1.04 g or a volumetric weight of 0.15 $g/cm^3$, and it allows for an elastic extension of 320%. According to this embodiment the weight is reduced with about 22% when compared to an unperforated prior art cushion assembly in which the volumetric weight is about 0.19 $g/cm^3$. According to an alternative embodiment, a cushion assembly comprising an area of 25 $cm^2$, and a thickness 0.335 cm, comprises a weight of 1.31 g or a volumetric weight of 0.16 $g/cm^3$. It is clear that this means a weight reduction of about 25% when compared to prior art embodiments which do not comprise such perforations, and which have for example a volumetric weight of about 0.21 $g/cm^3$.

Figure 6:
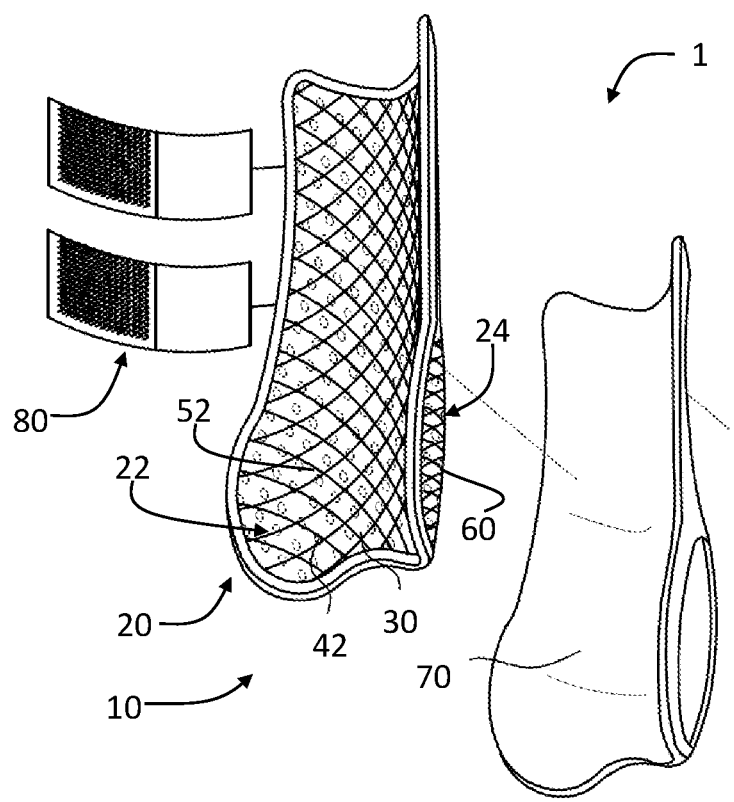
FIG. 6 shows an embodiment of an equine leg protection or support or tendon boot comprising the embodiment of the equine protective covering as shown in FIG. 5.
Figure 7:
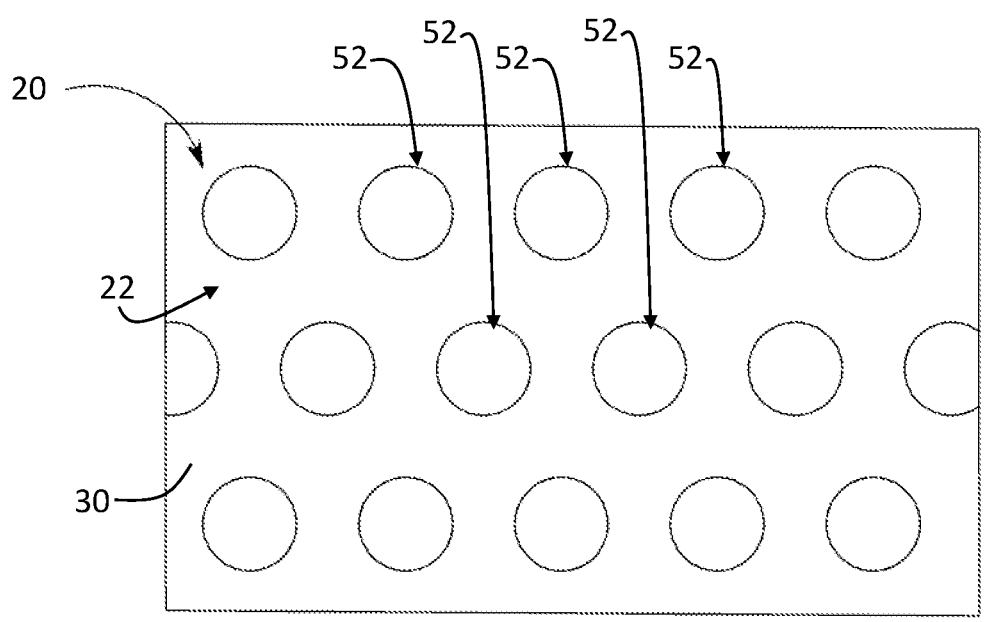
FIGS. 7 to 10 show alternative embodiments of the cushion assemblies of FIGS. 1 to 7 comprising patterns different from a diamond pattern.
Figure 11:
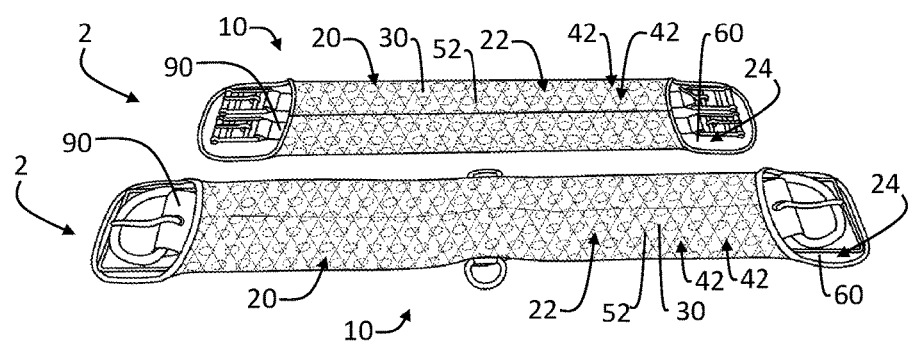
FIGS. 11 to 18 show alternative embodiments of assemblies making use of a cushion assembly of FIGS. 1 to 5.
Figure 12:
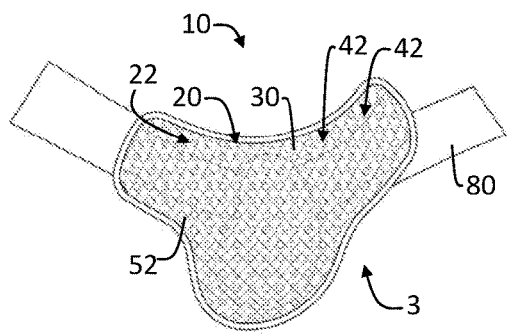
Figure 13:
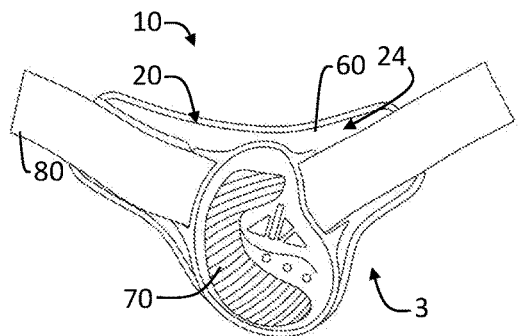
Figure 14:
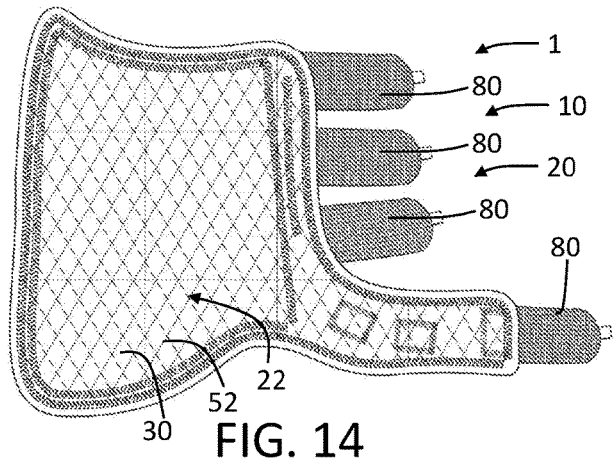
Figure 15:
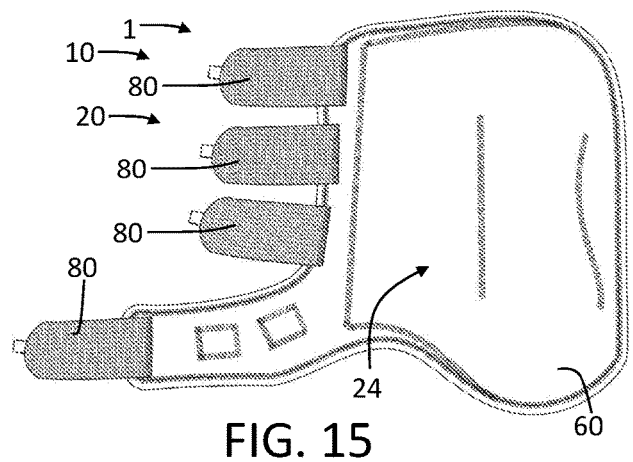
Figure 16:
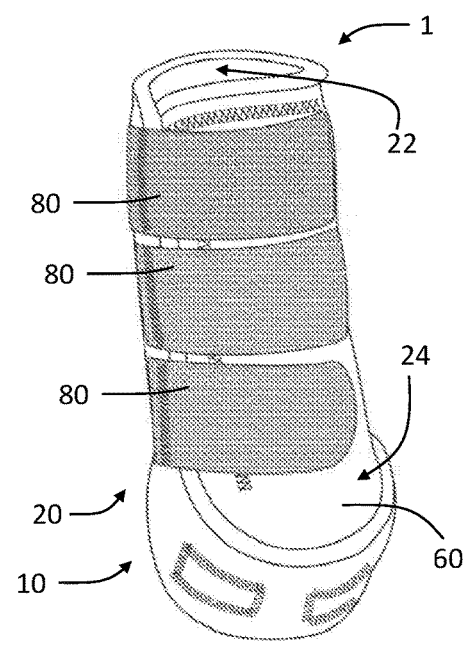
Figure 17:
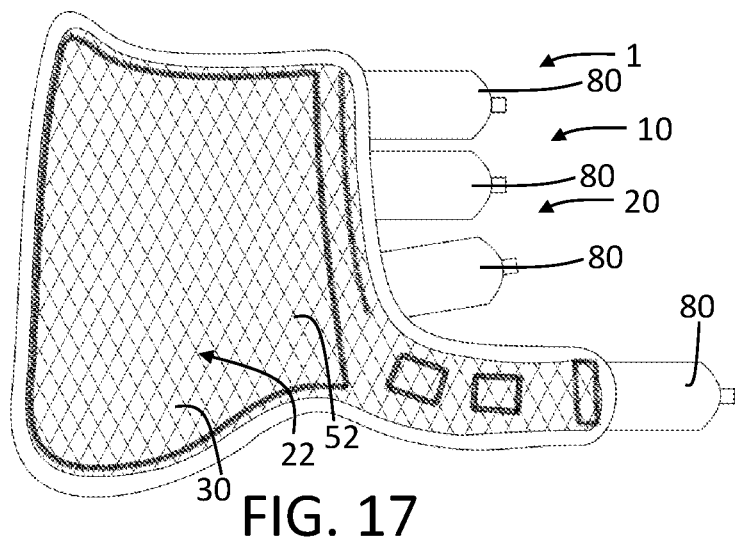
Figure 18:
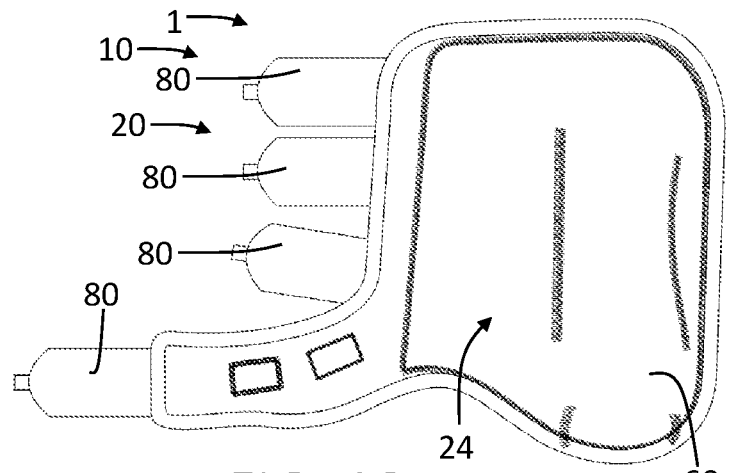

FIG. 6 shows an equine tendon boot 1 comprising an equine protective covering 10 comprising the embodiment of the cushion assembly 20 of FIG. 5. As generally know to a man skilled in the art, similar as for example known from US2009/0181206, the cushion assembly 20, according to the embodiment shown, is attached to a protection shell 70 at its exterior side 24 and provided with attachment means 80, such as for example of the Velcro type, to provide for releasable attachment to the equine leg. Such a protection shell 70 is typically made from a harder plastic material and optionally could also comprises one or more openings or other suitable means to allow for moisture and air circulation. However it is clear that other assemblies comprising such an equine protective covering 10 comprising a cushion assembly 20 as described above are possible. Such assemblies could for example be an equine saddle blanket, an equine girth protector, an equine tendon boot, an equine fetlock boot, an equine leg protection, an equine leg support, etc. Some examples of such alternative embodiments are shown in FIG. 11, which shows two embodiments of a girth 2 comprising a belt 90 surrounded by an embodiment of the cushion assembly 20 similar as explained with reference to FIG. 5, and FIGS. 12 and 13 which shows the front and back view of knee boots 3 comprising a cushion assembly 20 similar as explained with reference to FIG. 5. With respect to the latter embodiments, similar references denote similar elements, which generally have been manufactured and assembled in a similar way as explained above with reference to the embodiments of FIGS. 1-6. It is clear that still further alternative embodiments or combinations thereof are possible for the embodiments shown in FIGS. 11-13, especially with respect to the configuration of the patterns of the profiled shape 52 and/or the perforations 42, similar as explained above. FIGS. 14-18 show further alternative embodiments of an equine protective covering 10 comprising a cushion assembly 20 similar to the embodiment of cushion assembly 20 of FIG. 6. FIGS. 14-15 show a front and back view of an embodiment of an equine tendon boot 1, while FIG. 16 shows that embodiment of the equine tendon boot 1 in a closed state, such as it would be, when applied to the equine leg. Similar references denote similar elements, which generally have been manufactured and assembled in a similar way as explained above with reference to the embodiments of FIGS. 1-6. Different from the embodiment of FIG. 6, this embodiment does not comprise a protection shell 70 attached at the exterior side 24 of the cushion assembly 20. It is further clear that, similar as schematically shown in FIG. 6 with dotted lines, a plurality of perforations 42 also extends completely through the neoprene layer 40 of the cushion assembly 20 of this embodiment, however in these views the perforations are not shown, as the perforations are shielded by the unperforated first and second synthetic fabric layer. FIGS. 17 and 18 show a front and back view of still a further alternative embodiment of an equine protective covering 10 comprising a cushion assembly 20 similar to the embodiment of cushion assembly 20 of FIGS. 14-16. Similar references denote similar elements, which generally have been manufactured and assembled in a similar way as explained above with reference to the embodiments of FIGS. 1-6.

Figure 8:
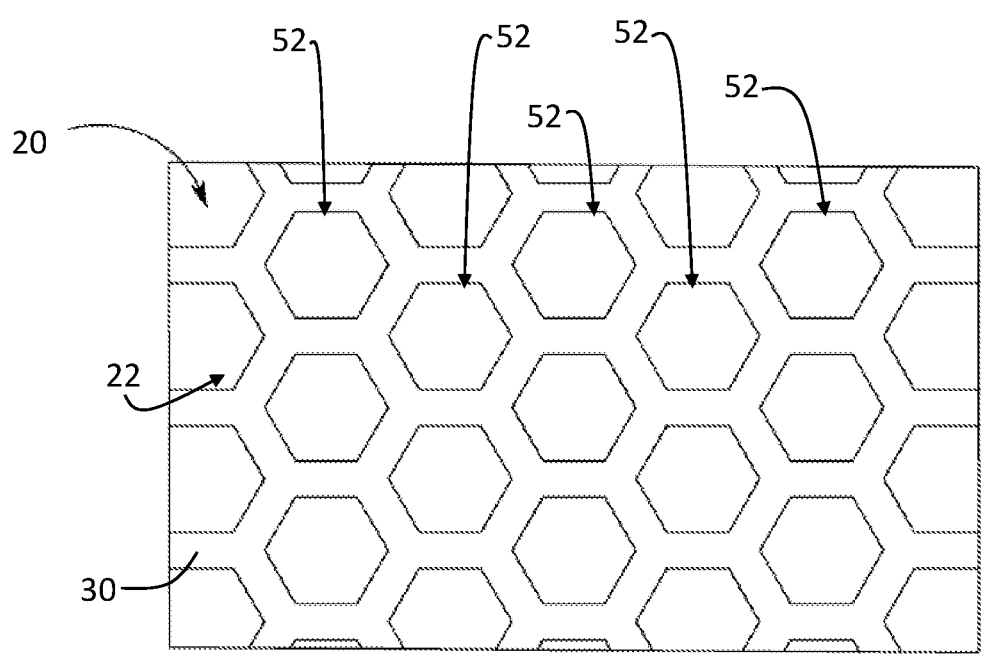
Figure 9:
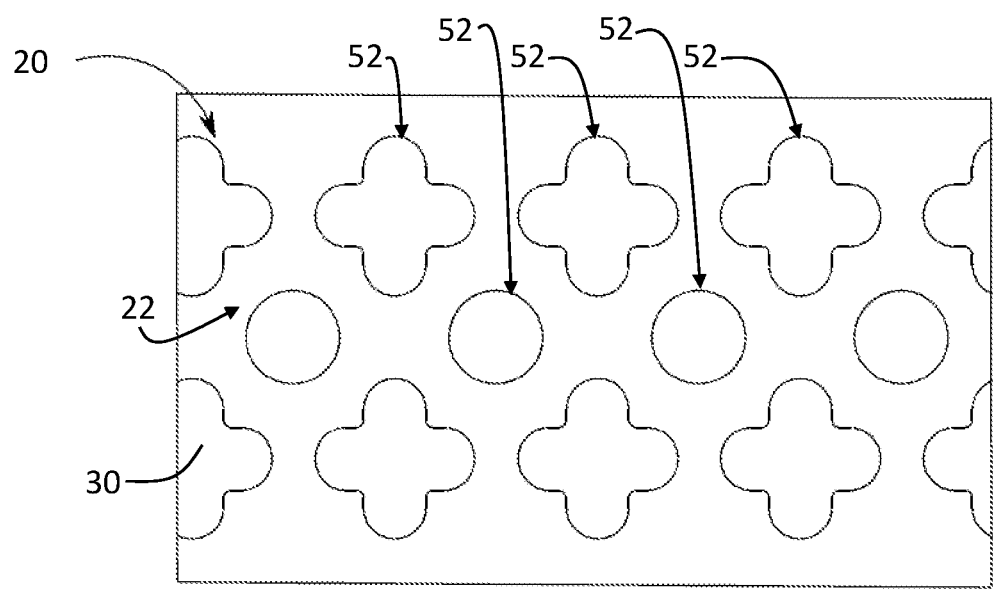
Figure 10:
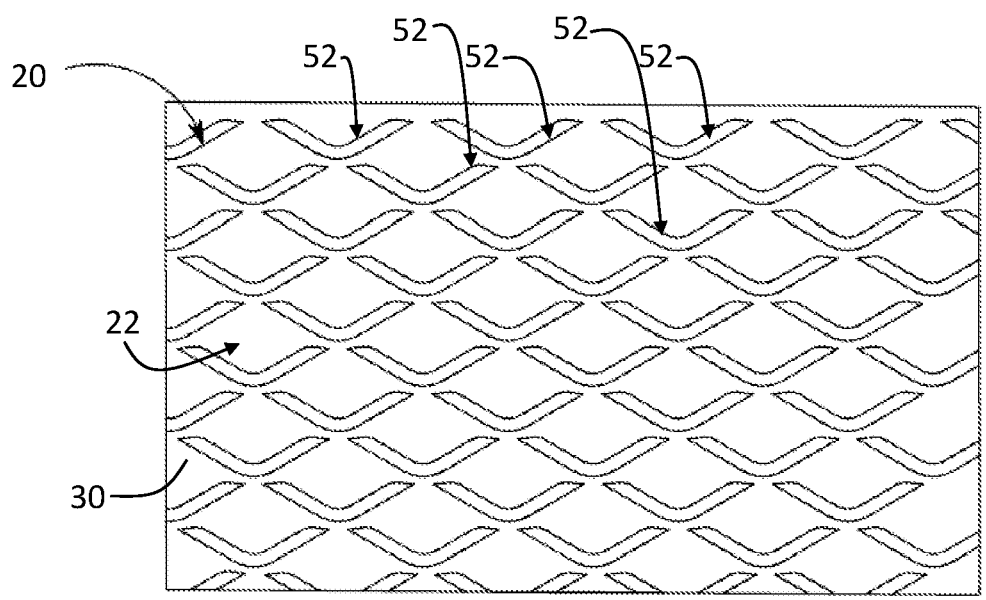

Although in the preceding embodiments, the embodiment of the equine protective covering 10 comprised a profiled shape 52 comprising a diamond pattern, it is clear that alternative embodiments are possible comprising a suitable shape for increasing moisture and air circulation. FIG. 8 for example shows a profiled shape comprising a circular pattern. FIGS. 9 to 11 show still further embodiments of profiled shapes 52 comprising suitable patterns comprising one or more straight or curved sections. It is however clear that still further alternative embodiments are possible or variations thereof, than the embodiments shown in the drawings.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A method of manufacturing an equine protective covering comprising a cushion assembly extending from a cushion interior side, which contacts the equine body when mounted, to a cushion exterior side, facing away from the equine body when mounted, wherein the cushion assembly comprises:
    a synthetic fabric layer at the cushion interior side; and
    a neoprene layer extending from the synthetic fabric layer towards the exterior side,
    wherein the method comprises the steps of:
    providing the neoprene layer;
    perforating the neoprene layer such that a plurality of perforations extend completely through the neoprene layer in a direction from the interior side to the exterior side;
    providing the synthetic fabric layer at the interior side of the cushion assembly to the neoprene layer;
    applying a stamp comprising a profiled shape with a predetermined temperature and pressure to the interior side of the cushion assembly such that concurrently:
    the synthetic fabric layer and the neoprene layer are permanently bonded;
    the neoprene layer is plastically deformed such that the profiled shape of the stamp is permanently transferred to the neoprene layer; and
    the plastic deformation of the neoprene layer is such that the perforations remain open.

2. The method of manufacturing according to claim 1, wherein the neoprene layer comprises perforations which cover a percentage of 20% to 80% of the surface of the neoprene layer.

3. The method of manufacturing according to claim 1, wherein the neoprene layer comprises perforations which cover a percentage of 40% to 70% of the surface of the neoprene layer.

4. The method of manufacturing according to claim 1, wherein the volumetric weight of the cushion assembly is 0.20 g/cm$^3$ or lower.

5. The method of manufacturing according to claim 1, wherein the volumetric weight of the cushion assembly is 0.16 g/cm$^3$ or lower.

6. The method of manufacturing according to claim 1, wherein the synthetic fabric layer comprises one or more of the following:
    a knit fabric comprising synthetic fibres; and
    a stretch fabric.

7. The method of manufacturing according to claim 1, wherein in that the neoprene layer comprises one or more of the following:
    a solid neoprene layer; and
    a foamed neoprene layer.

8. The method of manufacturing according to claim 1, wherein:
    the synthetic fabric layer comprises a thickness in the range of 0.2 mm to 5 mm; and
    the neoprene layer comprises a thickness in the range of 2 mm to 20 mm.

9. The method of manufacturing according to claim 1, wherein:
    the predetermined temperature and pressure is sufficiently high to bond the synthetic fabric layer and the neoprene layer permanently and to deform the neoprene layer plastically such that the profiled shape of the stamp is permanently transferred to the neoprene layer; and
    the predetermined temperature and pressure is sufficiently low such that the plastic deformation of the neoprene layer is such that the perforations remain open.

10. The method of manufacturing according to claim 1, wherein the method comprises the further step of:
   providing another synthetic fabric layer at the exterior side of the neoprene layer of the cushion assembly, after the neoprene layer was perforated and before the stamp is applied.

11. The method of manufacturing according to claim 1, wherein the profiled shape comprises:
   a diamond pattern;
   a circular pattern; or
   a pattern comprising one or more straight or curved sections.

12. An equine protective covering manufactured according to the method according to claim 1, wherein the cushion assembly comprises:
   the synthetic fabric layer and the neoprene layer that are permanently bonded;
   the neoprene layer that is plastically deformed such that the profiled shape of the stamp is permanently transferred to the neoprene layer; and
   wherein the plastic deformation of the neoprene layer is such that the perforations remain open.

13. An assembly comprising an equine protective covering according to claim 12, wherein the assembly comprises one or more of the following:
   an equine saddle blanket;
   an equine girth protector;
   an equine tendon boot;
   an equine fetlock boot; and
   an equine knee boot.

* * * * *